United States Patent
Kurihara et al.

(10) Patent No.: US 9,341,460 B2
(45) Date of Patent: May 17, 2016

(54) DOUBLE CONE STYLUS, TOUCH PROBE, AND METHOD OF CALIBRATING DOUBLE CONE STYLUS

(71) Applicant: MITUTOYO CORPORATION, Kanagawa (JP)

(72) Inventors: Masaki Kurihara, Kanagawa (JP); Yasuhiro Takahama, Kanagawa (JP); Masanori Arai, Kanagawa (JP); Tomoyuki Miyazaki, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 217 days.

(21) Appl. No.: 14/056,321

(22) Filed: Oct. 17, 2013

(65) Prior Publication Data
US 2014/0109420 A1 Apr. 24, 2014

(30) Foreign Application Priority Data
Oct. 19, 2012 (JP) .................................. 2012-232407

(51) Int. Cl.
*G01B 5/016* (2006.01)
*G01B 5/012* (2006.01)
*G01B 21/04* (2006.01)
*G01B 7/012* (2006.01)

(52) U.S. Cl.
CPC ................ *G01B 5/016* (2013.01); *G01B 5/012* (2013.01); *G01B 7/012* (2013.01); *G01B 21/042* (2013.01)

(58) Field of Classification Search
CPC ................................ G01B 5/016; G01B 5/012
USPC ...................... 33/502, 503, 556, 559; 73/1.79
See application file for complete search history.

(56) References Cited

U.S. PATENT DOCUMENTS

| | | | | |
|---|---|---|---|---|
| 3,483,630 | A * | 12/1969 | Davies et al. | 33/501.14 |
| 5,649,368 | A * | 7/1997 | Herzog et al. | 33/502 |
| 6,240,651 | B1 | 6/2001 | Schroeder et al. | |
| 6,516,669 | B2 * | 2/2003 | Matsuki | G01B 7/016 33/503 |
| 7,905,027 | B2 * | 3/2011 | MacManus | G01B 21/10 33/502 |
| 2002/0005062 | A1 | 1/2002 | Matsuki et al. | |
| 2002/0108446 | A1 | 8/2002 | Matsuki et al. | |
| 2003/0009257 | A1 * | 1/2003 | Sutherland | G01B 21/042 700/195 |
| 2007/0086620 | A1 * | 4/2007 | Arai | G01B 5/008 382/100 |
| 2009/0100917 | A1 | 4/2009 | Ukraintsev | |

(Continued)

FOREIGN PATENT DOCUMENTS

| | | |
|---|---|---|
| DE | 29824806 | 10/2002 |
| EP | 0269795 | 6/1988 |

(Continued)

OTHER PUBLICATIONS

Search report from E.P.O., mail date is Feb. 25, 2014.

(Continued)

*Primary Examiner* — Christopher Fulton
(74) *Attorney, Agent, or Firm* — Greenblum & Bernstein, P.L.C.

(57) ABSTRACT

A double cone stylus includes a shank and a double cone-shaped tip attached to the tip end of the shank, the double cone-shaped tip being a rotationally symmetric body obtained by rotating a triangle having a base extending along the shank around the shank as the symmetric rotation axis. The double cone stylus allows the shape of an inner wall surface of a measurement object with the inner wall surface retracted from an upper reference plane to be measured from above.

6 Claims, 16 Drawing Sheets

(56) References Cited

U.S. PATENT DOCUMENTS

| | | | |
|---|---|---|---|
| 2010/0250178 A1* | 9/2010 | Noda | G01B 5/008 702/95 |
| 2011/0030520 A1 | 2/2011 | Joncour | |

FOREIGN PATENT DOCUMENTS

| | | | |
|---|---|---|---|
| FR | 2930050 | 10/2009 | |
| GB | 2220748 | 1/1990 | |
| JP | 2002340544 A * | 11/2002 | |
| JP | 2003-97937 | 4/2003 | |
| JP | 2004-317159 | 11/2004 | |
| JP | 3819250 | 9/2006 | |
| JP | 2011-85399 | 4/2011 | |
| JP | 2011-85403 | 4/2011 | |
| WO | 00/25087 | 5/2000 | |
| WO | WO 2012037059 A1 * | 3/2012 | G01B 5/008 |

OTHER PUBLICATIONS

EPO Search Report dated Nov. 25, 2013.

* cited by examiner

PRIOR ART
FIG.1 (A) STRAIGHT STYLUS
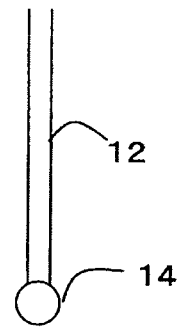
FIG.1 (B) DISC STYLUS
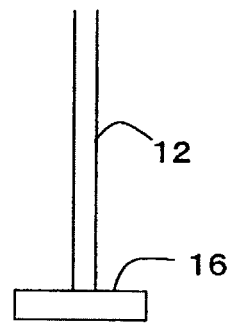
FIG.1 (C) CYLINDRICAL STYLUS
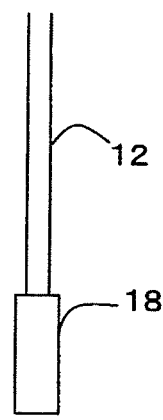

Fig. 5
FIG.5 (A)
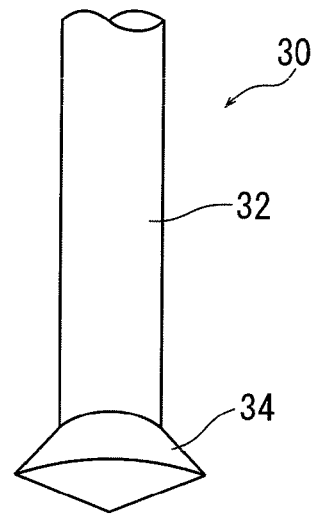
FIG.5 (B)
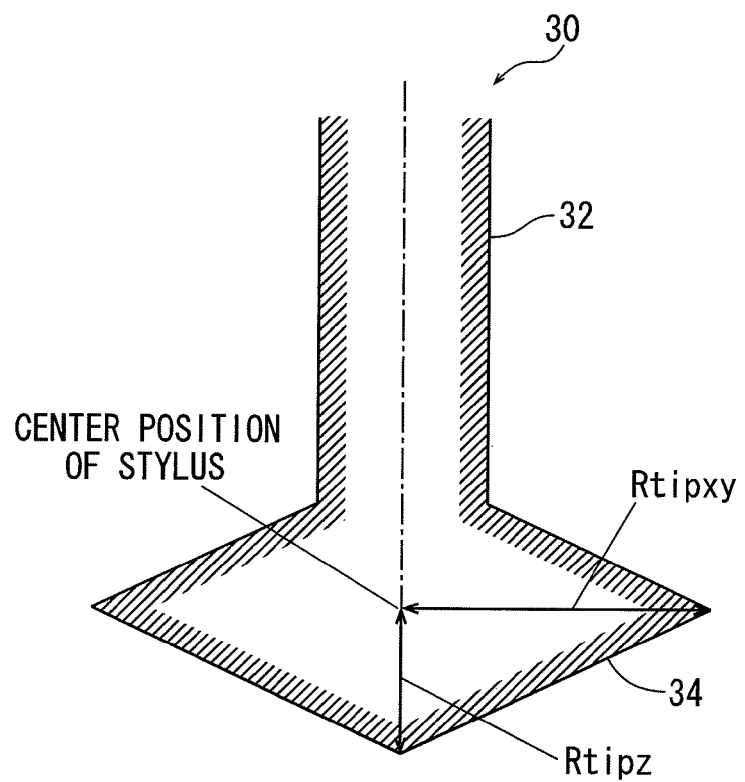

ZX PLANE

NORTH POLE PLANE OF
MB (XY PLANE)

DOUBLE CONE STYLUS, TOUCH PROBE, AND METHOD OF CALIBRATING DOUBLE CONE STYLUS

CROSS-REFERENCE TO RELATED APPLICATION

The disclosure of Japanese Patent Application No. 2012-232407 filed on Oct. 19, 2012, including specifications, drawings and claims is incorporated herein by reference in its entirety.

TECHNICAL FIELD

The present invention relates to a double cone stylus, to a touch probe, and to a method of calibrating the double cone stylus. The present invention particularly relates to a double cone stylus suitable to be used to measure, from above, the shape of the inner wall of a measurement object with the inner wall retracted from an upper reference plane, to a touch probe having the double cone stylus attached thereto, and a method of calibrating the double cone stylus in order to calibrate the dimensions of the stylus tip.

BACKGROUND ART

In one known three-dimensional coordinate measuring machine (hereinafter may be simply referred to as a coordinate measuring machine or contour measuring machine), the stylus tip (hereinafter may be simply referred to as a tip) of a touch probe is moved along the surface of a measurement object continuously to perform point-to-point measurement at predetermined intervals, whereby the surface contour of the measurement object is measured. Various types of styluses are used for the touch probe, and examples thereof include: a straight stylus shown in FIG. 1(A) in which a spherical stylus tip 14 is attached to the tip end (the lower end) of a shank 12; a disc stylus shown in FIG. 1(B) in which a disc-shaped stylus tip 16 is attached to the tip end of a shank 12; and a cylindrical stylus shown in FIG. 1(C) in which a cylindrical stylus tip 18 is attached to the tip end of a shank 12. The present applicant has proposed, in Patent Literature 1, a stylus with a flat end face as a modification of the disc stylus.

CITATION LIST

Patent Literature

Patent Literature 1: Japanese Patent No. 3819250 (FIG. 8(a), paragraph 0060)
Patent Literature 2: Japanese Patent Application Laid-Open No. 2003-97937
Patent Literature 3: Japanese Patent Application Laid-Open No. 2004-317159
Patent Literature 4: Japanese Patent Application Laid-Open No. 2011-85399
Patent Literature 5: Japanese Patent Application Laid-Open No. 2011-85403

SUMMARY OF INVENTION

Technical Problem

However, the conventional styluses have a problem in that although, as exemplified by a straight stylus in FIG. 2(A), measurement can be performed on an inner wall surface 8B of a hole of a measurement object 8 that is perpendicular to a reference plane 8A (the upper surface in the figure) or has a gradually protruded lower portion, measurement cannot be performed on an inner wall surface 8C having a retracted lower portion as exemplified in FIG. 2(B), on a lower edge 8D of a hole as exemplified in FIG. 2(C), and on an irregular surface 8E in a lower portion of a hole as exemplified in FIG. 2(D). In addition, the disc stylus with a flat end face proposed in Patent Literature 1 has a problem in that measurement cannot be performed on a reference plane 8A.

Various methods have been proposed to calibrate the above-described straight stylus, disc stylus, cylindrical stylus, etc. For example, Patent Literatures 2 and 3 each describe a method for calibrating a straight stylus using a reference ball. However, the calibration method proposed by the applicant is not suitable for a novel double cone stylus proposed in this invention.

In recent years, measurement objects are becoming smaller and finer. In accordance with the trend toward a reduction in size of measurement objects and measurement areas, the burden on the measurer is increasing because the operation of setting a stylus is very difficult and time consuming. In addition, for some measurement objects, the stylus may interfere (collide) with the measurement objects, and this causes the stylus and the measurement objects to be damaged.

Accordingly, the applicant is developing a coordinate measuring machine including, in addition to a touch probe having a stylus that comes into contact with a measurement object, a vision probe for taking an image of the surface of the measurement object.

In this coordinate measuring machine, first, an image of the measurement object is acquired using the vision probe, and a measurement start position is specified on the acquired image of the measurement object. Then the moving trajectory of a relative movement mechanism is computed and stored so that the stylus of the touch probe comes into contact with the measurement start position of the measurement object. After completion of the measurement, the relative movement mechanism is actuated, and the stylus of the touch probe is moved along the stored movement trajectory and comes into contact with the measurement start position of the measurement object automatically.

Since the stylus of the touch probe can be automatically placed at the measurement start position of the measurement object, the measurer is not necessary to place the tip end of the stylus at the measurement start position of the measurement object while the position of the tip end of the stylus relative to the measurement start position of the measurement object is visually checked to adjust the relative position, as in conventional machines. Therefore, the burden on the measurer can be reduced, and the interference (collision) between the stylus and the measurement object can be prevented.

However, as exemplified in FIG. 3, the vision probe 24 and the touch probe 26 having the stylus are disposed offset from each other in a common measurement head 22 because of physical and structural reasons. In this figure, reference numeral 8 represents the measurement object, and 20 represents the measuring machine.

Therefore, when the vision probe 24 is switched to the touch probe 26 or when the touch probe 26 is switched to the vision probe 24, control must be performed with the amount of offset between the touch probe and the vision probe calibrated. Thus, it is important to correctly grasp the amount of offset between the touch probe and the vision probe, in order to perform measurement with high accuracy.

Accordingly, the applicant has proposed, in Patent Literatures 3 and 4, offset calibration methods that can correctly determine the amount of offset. However, these methods cannot be applied to a double cone stylus.

Solution to Problem

The present invention has been made in order to solve the above-described problems in association with the conventional technique, and a first object of the present invention is to provide a double cone stylus suitable to be used for a measurement object having an inner wall retracted from an upper reference plane.

A second object of the present invention is to provide a touch probe for coordinate measurement.

A third object of the present invention is to enable calibration of the double cone stylus.

The present invention achieves the above-described first object by providing a double cone stylus comprising a shank having a tip end and a double cone-shaped tip attached to the tip end of the shank, the double cone-shaped tip being a rotationally symmetric body obtained by rotating a triangle having a base extending along the shank around the shank as a symmetric rotation axis.

A tip end and/or a circumferential edge of the double cone-shaped tip may be rounded.

The present invention achieves the above-described second object by providing a touch probe for coordinate measurement or contour measurement, the touch probe comprising the above-described double cone stylus.

The present invention also provides a coordinate measuring machine or contour measuring machine comprising the above-described touch probe.

The coordinate measuring machine or contour measuring machine provided by the present invention may further comprise a vision probe.

The present invention achieves the above-described third object by providing a method of calibrating a double cone stylus included in a coordinate measuring machine or contour measuring machine including a touch probe having the double cone stylus attached to a tip end thereof, the method comprising, when dimensions of a stylus tip of the double cone stylus are calibrated: disposing a master ball with a calibration value in the coordinate measuring machine or contour measuring machine; performing touch measurement on the master ball using the touch probe to acquire a center position and a radius of the master ball; computing a radius of the stylus tip in a horizontal direction; performing touch measurement to determine a position of an apex of the master ball using the touch probe to acquire a height of the apex of the master ball; and computing a radius of the stylus tip in a height direction.

The radius of the stylus tip in the horizontal direction may be computed by: determining provisional values of the center position of the master ball using values measured near the apex of the master ball; performing measurement on the master ball along search lines extending in a vertical direction around an equator of the master ball that is determined from the measured provisional values of the center position to thereby determine final values of the center position of the master ball and a final value of the radius of the master ball; and computing the radius of the stylus tip in the horizontal direction using the measured final value of the radius of the master ball. The radius of the stylus tip in the height direction may be computed by performing touch measurement at the center position of the master ball to determine the position of the apex of the master ball.

The present invention also achieves the above-described third object by providing a method of calibrating a double cone stylus included in a coordinate measuring machine or contour measuring machine including a vision probe and a touch probe having the double cone stylus attached to a tip end thereof, the method comprising, when dimensions of a stylus tip of the double cone stylus and an offset between the touch probe and the vision probe are calibrated: disposing a master ball with a calibration value and a ring gauge on the coordinate measuring machine or contour measuring machine; and performing measurement sequentially on the mater ball and the ring gauge using the touch probe and the vision probe to calibrate the dimensions of the stylus tip and the offset between the touch probe and the vision probe.

An offset distance between the touch probe and the vision probe may be computed by performing measurement on the ring gauge using the vision probe and the touch probe sequentially.

An offset distance between the vision probe and the touch probe in a horizontal direction may be computed by measuring a circle center position of the ring gauge using the vision probe and measuring the circle center position of the ring gauge using the touch probe.

An offset distance between the vision probe and the touch probe in a height direction may be computed by measuring a position of an upper surface of the ring gauge using the vision prove and measuring a height when the touch probe touches the upper surface of the ring gauge.

Advantageous Effects of Invention

According to the present invention, the shape of an inner wall surface 8C of a measurement object 8 with the inner wall surface retracted from an upper reference plane 8A, a lower edge 8D of a hole of a measurement object 8, an irregular surface 8E of a measurement object 8, etc. can be measured using a double cone stylus tip 34 from above, as shown in FIGS. 4(A) to 4(C). This stylus tip 34 having a tip end 34A allows measurement from a position above the reference plane 8A, which is difficult to perform using a disc stylus and the stylus proposed in Patent Literature 1.

According to the calibration method of the present invention, the radii of the stylus tip can be correctly calibrated in the approach directions (plane and height directions) of the double cone stylus. Therefore, correct measurement results can be obtained by measurement using the double cone stylus. The use of the calibrated offset values allows the position measured using the vision probe to be measured using the touch probe.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein;

FIGS. 1(A) to 1(C) are front views illustrating various conventional styluses;

FIGS. 5(A) and 5(B) are diagrams illustrating the dimensions and shape of the double cone stylus according to the present invention, FIG. 5(A) being a perspective view, FIG. 5(B) being a vertical cross-sectional view as viewed from the front;

DESCRIPTION OF EMBODIMENTS

Embodiments of the present invention will be described below in detail with reference to the drawings.

Figure 2:
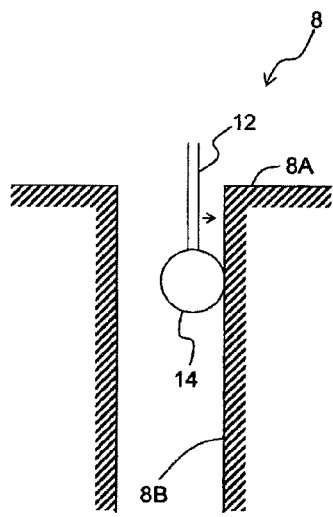
FIGS. 2(A) to 2(D) are cross-sectional views illustrating problems in association with a conventional straight stylus.
Figure 2:
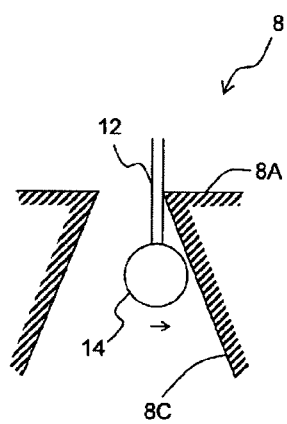
Figure 2:
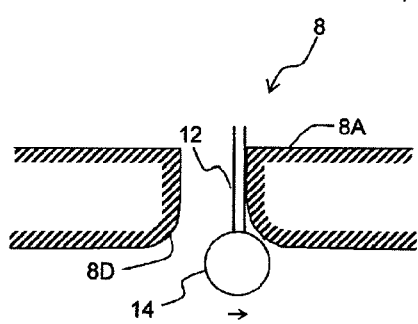
Figure 2:
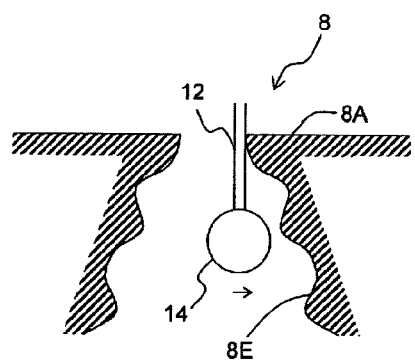
Figure 3:
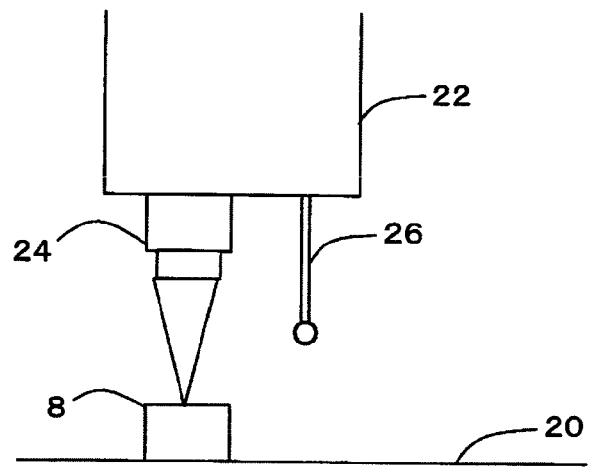
FIG. 3 is a perspective view illustrating the tip end of the head of a coordinate measuring machine provided with a touch probe and a vision probe in combination.
Figure 4:
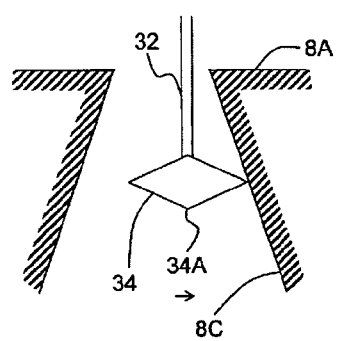
FIGS. 4(A) to 4(C) are cross-sectional views each illustrating a state in which measurement is performed using the double cone stylus according to the present invention.
Figure 4:
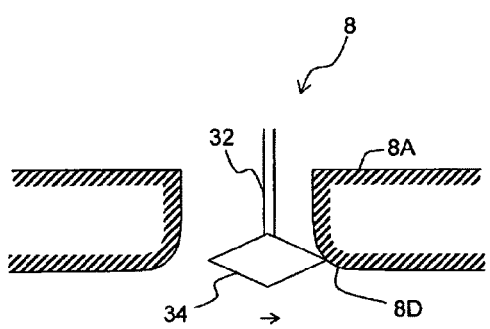
Figure 4:
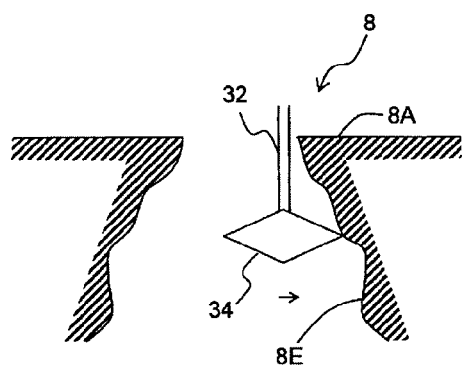
Figure 6:
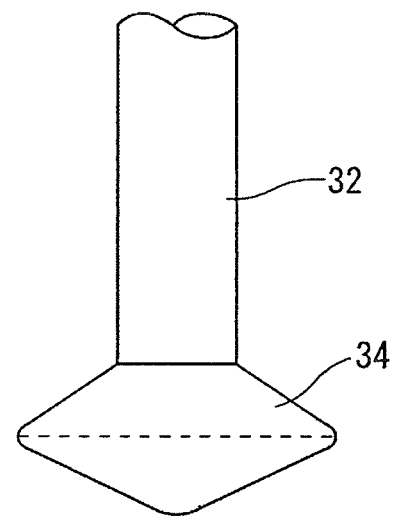
FIG. 6 is a front view illustrating a modification of the double cone stylus according to the present invention.

As shown in FIGS. 5(A) and 5(B), a double cone stylus 30 in this embodiment includes a shank 32 and a double cone-shaped stylus tip 34 attached to the tip end (the lower end) of the shank 32. The double cone-shaped stylus tip 34 is a rotationally symmetric body obtained by rotating a triangle having a base extending along the shank 32 around the shank 32 as the symmetric rotation axis. The stylus tip 34 may not be vertically symmetric, and the tip end (the lower end in the figures) and/or the circumferential edge of the stylus tip 34 may be slightly rounded as shown in FIG. 6.

A description will next be given of a calibration method using as an example an image measuring machine, which is one coordinate measuring machine, including a vision probe 24 and a touch probe (TP) 28 equipped with the double cone stylus 30 in combination, as exemplified in FIG. 7.

Figure 7:
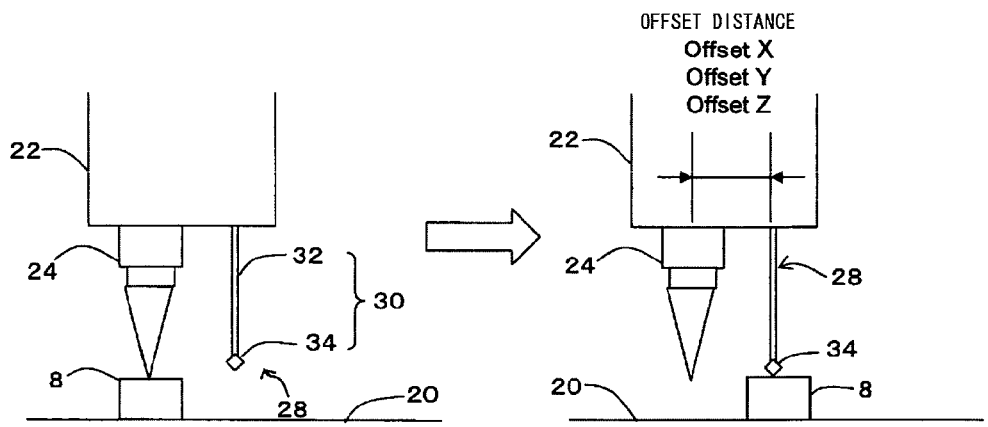
FIG. 7 is a set of front views illustrating a state in which an offset is measured in an embodiment of the calibration method according to the present invention.

FIG. 7 illustrates a state in which an offset is measured according to the present invention. The calibration values for the stylus in this embodiment are tip radii Rtipxy and Rtipz shown in FIG. 5(B) and offset distances OffsetX, OffsetY, and OffsetZ between the vision probe 24 and the center of the stylus tip 34 of the touch probe 28. The offset distances are defined with reference to the focal point of an objective lens of the vision probe 24.

The procedure of the measurement in this embodiment will be described with reference to FIG. 8.

Figure 9:
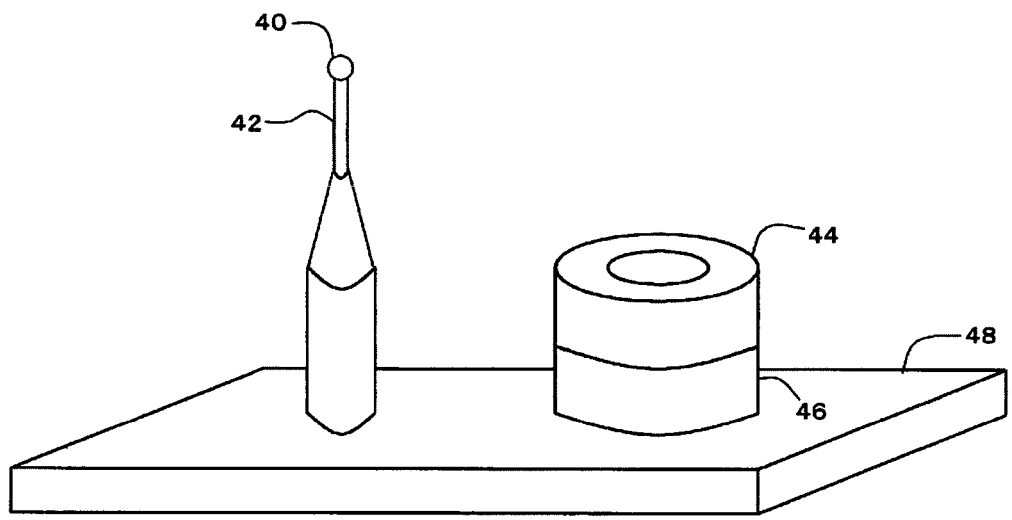
FIG. 9 is a perspective view illustrating a master ball and a ring gauge used in the embodiment.

First, in step 100, preparation before calibration is performed. Specifically, a master ball (MB) 40 with a calibrated sphere radius exemplified in FIG. 9 is prepared and placed on a measuring machine 20. The calibrated sphere radius of the master ball 40 is defined as Rmbcal. A ring gauge 44 is prepared and placed on the measuring machine 20. In FIG. 9, reference numeral 42 represents a support stay for the master ball 40, 46 represents a support of the ring gauge 44, and 48 represents a base for securing these components. The base 48 may be omitted, and the master ball 40 and the ring gauge 44 may be directly placed on the measuring machine 20.

Figure 10:
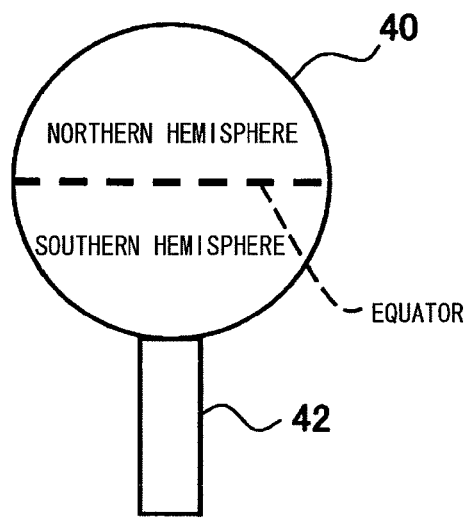
FIG. 10 is a diagram illustrating the definition of the master ball.

Next, the process proceeds to step 200, and the radii of the stylus tip are calibrated using the master ball 40. In the following description, the master ball 40 is likened to the Earth, and the equator, northern hemisphere, and southern hemisphere are defined as shown in FIG. 10.

Figure 11:
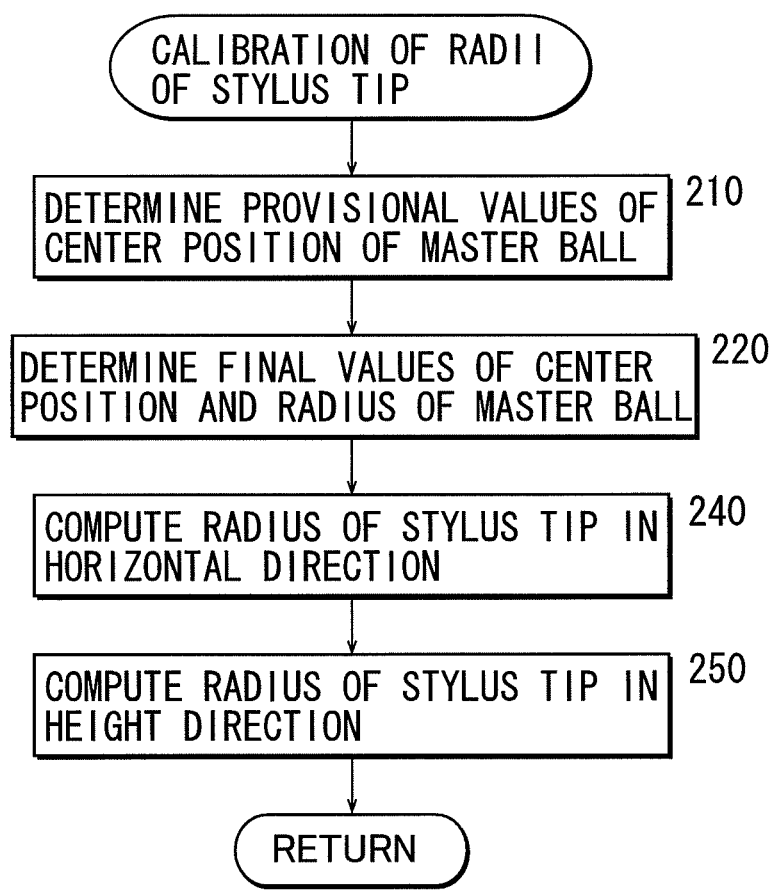
FIG. 11 is a flowchart showing the procedure of calibrating the radii of a stylus tip.

Specifically, according to the procedure shown in FIG. 11, the provisional values of the center position of the master ball (Xmbtmp, Ymbtmp, Zmbtmp) are determined in step 210.

Figure 12:
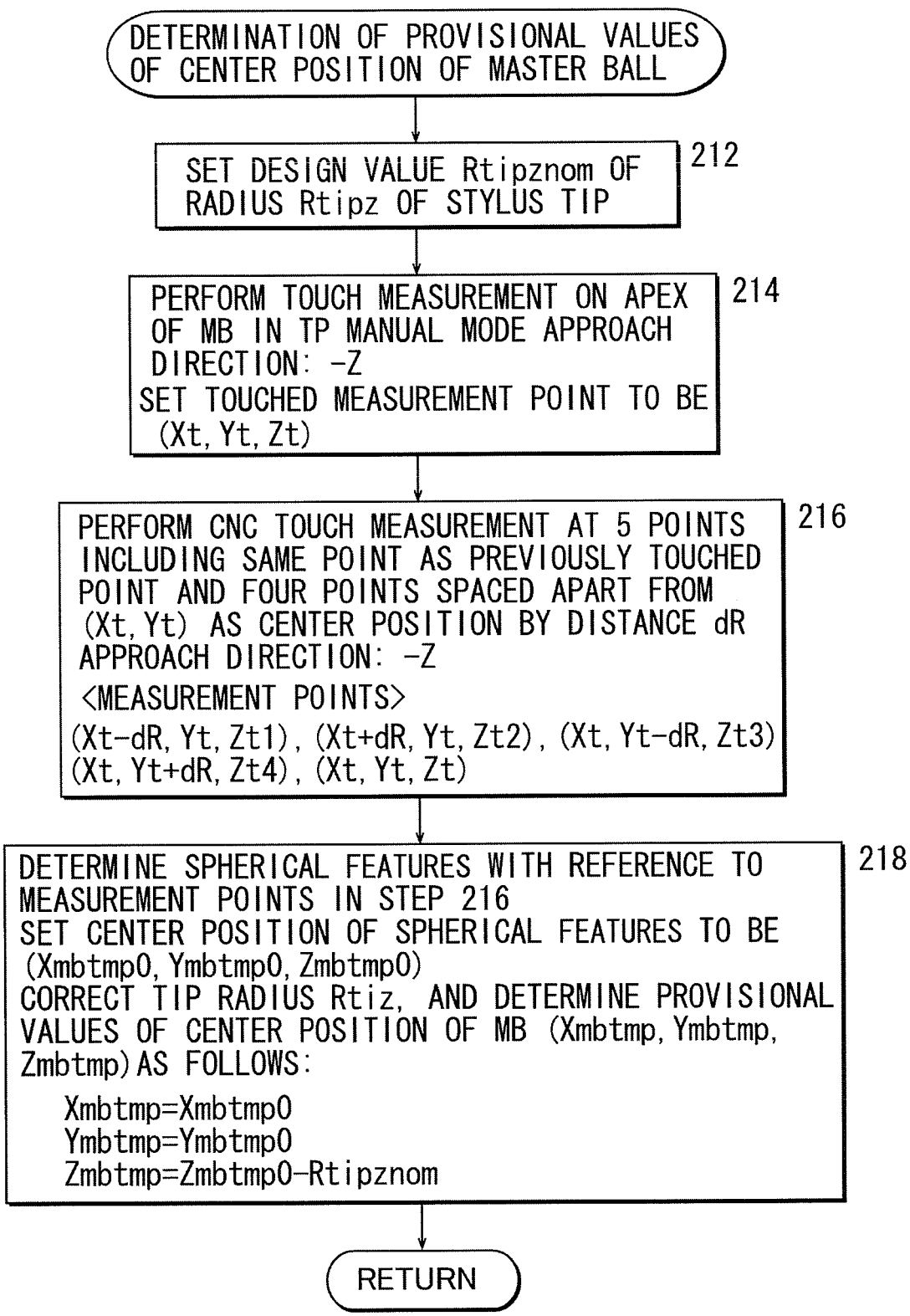
FIG. 12 is a flowchart showing the procedure of determining the provisional values of the center of the master ball.
Figure 13:
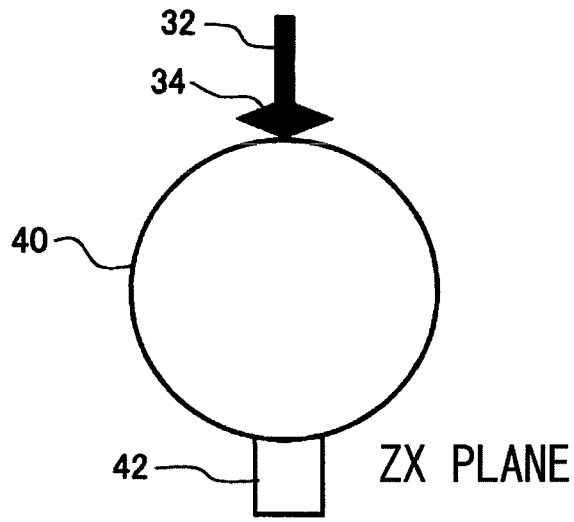
FIG. 13 is a front view illustrating a state in which the provisional values of the center of the master ball are determined.

More specifically, the design value Rtipznom of the radius Rtipz of the stylus tip is set in step 212 in FIG. 12. Next, in step 214, touch measurement is performed on the apex of the master ball 40 using the touch probe (TP) 28 in a manual mode, as shown in FIG. 13. In this case, the direction of approach is −Z, and the measured touched point is set to be (Xt, Yt, Zt).

Figure 14:
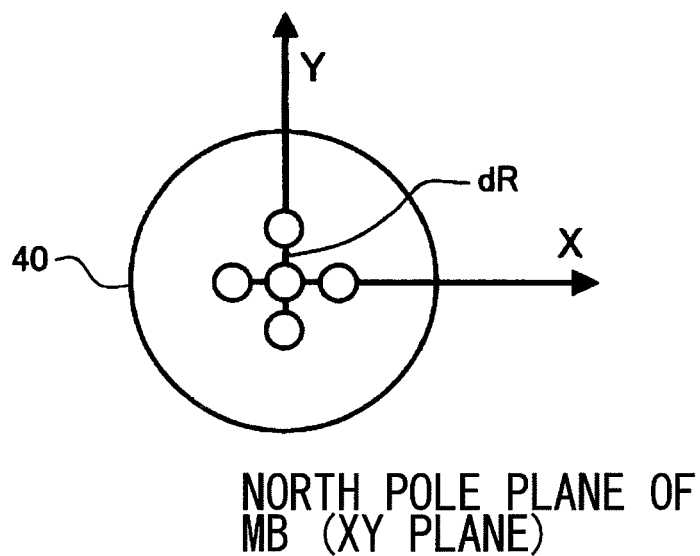
FIG. 14 is a plan view of FIG. 13.

Next, the process proceeds to step 216, and touch measurement is performed at five points including the same point as the previously touched point and four points spaced apart from (Xt, Yt) as the center by distance dR, as shown in FIG. 14. The direction of approach in this case is −Z, and the measurement points are (Xt−dR, Yt, Zt1), (Xt+dR, Yt, Zt2), (Xt, Yt−dR, Zt3), (Xt, Yt+dR, Zt4), and (Xt, Yt, Zt).

Then the process proceeds to step 218, and spherical features are determined with reference to the measurement points in step 216. The position of the center of the spherical features is set to be (Xmbtmp0, Ymbtmp0, Zmbtmp0).

The tip radius Rtipz is thereby corrected, and the provisional values of the center of the master ball (Xmbtmp, Ymbtmp, Zmbtmp) are determined as follows.

$$Xmbtmp = Xmbtmp0 \tag{1}$$

$$Ymbtmp = Ymbtmp0 \tag{2}$$

$$Zmbtmp = Zmbtmp0 - Rtipznom \tag{3}$$

Figure 15:
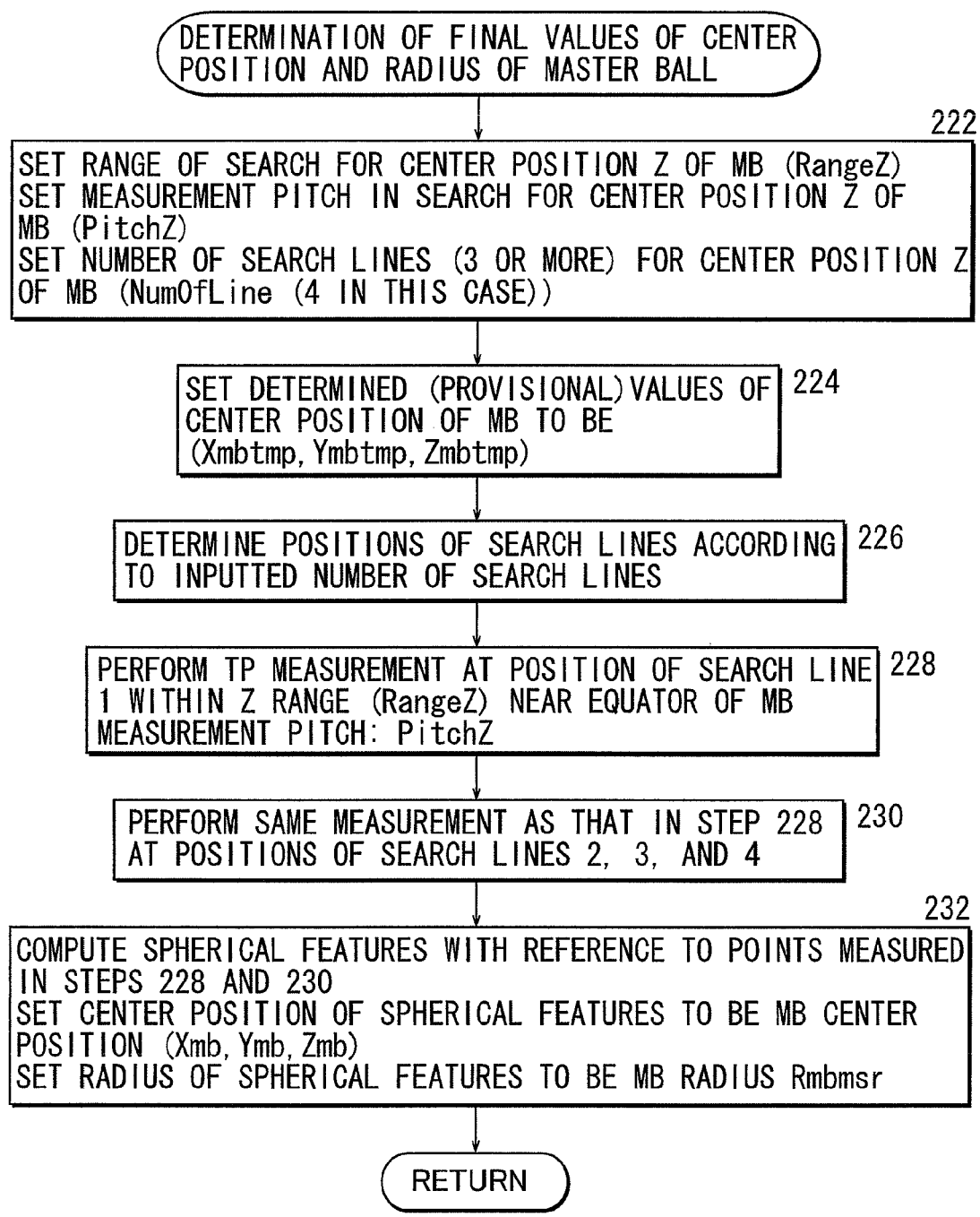
FIG. 15 is a flowchart showing the procedure of determining the final values of the center and radius of the master ball.

Then the process proceeds to step 220 in FIG. 11, and the final values of the center position and radius of the master ball 40 are determined. Specifically, the following values are preset in step 222 in FIG. 15.

The range of search for the center position Z of the MB: RangeZ

The measurement pitch in the search for the center position Z of the MB: PitchZ

The number of search lines for the center position of the MB (3 or larger): NumOfLine (4 in this case)

Next, in step 224, the determined (provisional) values of the center position of the master ball 40 are set to be (Xmbtmp, Ymbtmp, Zmbtmp).

Figure 16:
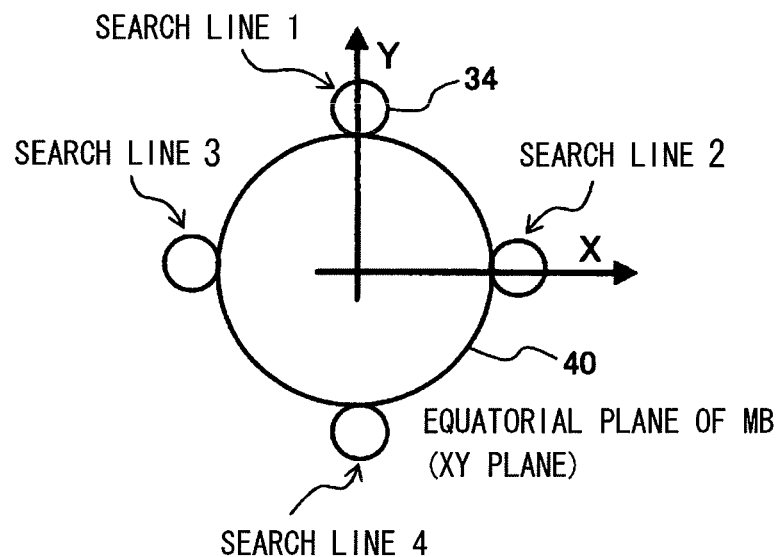
FIG. 16 is a plan view illustrating a state in which the final values of the center and radius of the master ball are determined.

Next, the process proceeds to step 226. According to the inputted number of search lines (4 in this case), the positions of the search lines 1 to 4 in a vertical direction (height direction) exemplified in FIG. 16 are determined.

Figure 17:
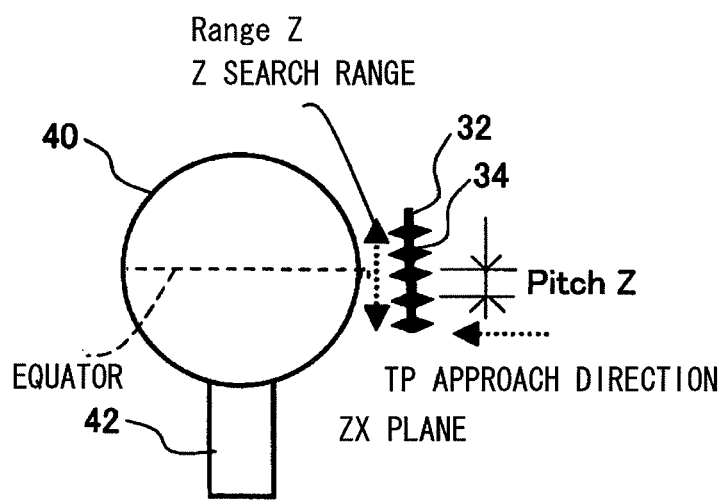
FIG. 17 is a front view of FIG. 16.

Next, the process proceeds to step 228, and touch measurement is performed at the position of the search line 1 within the Z range (RangeZ) near the equator of the master ball, as exemplified in FIG. 17. The measurement pitch in this case is PitchZ.

Next, the process proceeds to step 230, and the same measurement as that in step 228 is performed at the positions of the search lines 2, 3, and 4.

Next, the process proceeds to step 232, and spherical features are computed with reference to the points measured in steps 228 and 230. The center position of the spherical features is set to be the spherical center position of the master ball 40 (Xmb, Ymb, Zmb). The radius of the spherical features is set to be the radius Rmbmsr of the master ball.

Next, the process proceeds to step 240 in FIG. 11, and the radius Rtipxy of the stylus tip is computed.

Specifically, with reference to the determined final value of the radius Rmbmsr of the master ball 40, the radius Rtipxy of the stylus tip is computed using the following formula.

$$Rtipxy = Rmbmsr - Rmbcal \quad (4)$$

Figure 18:
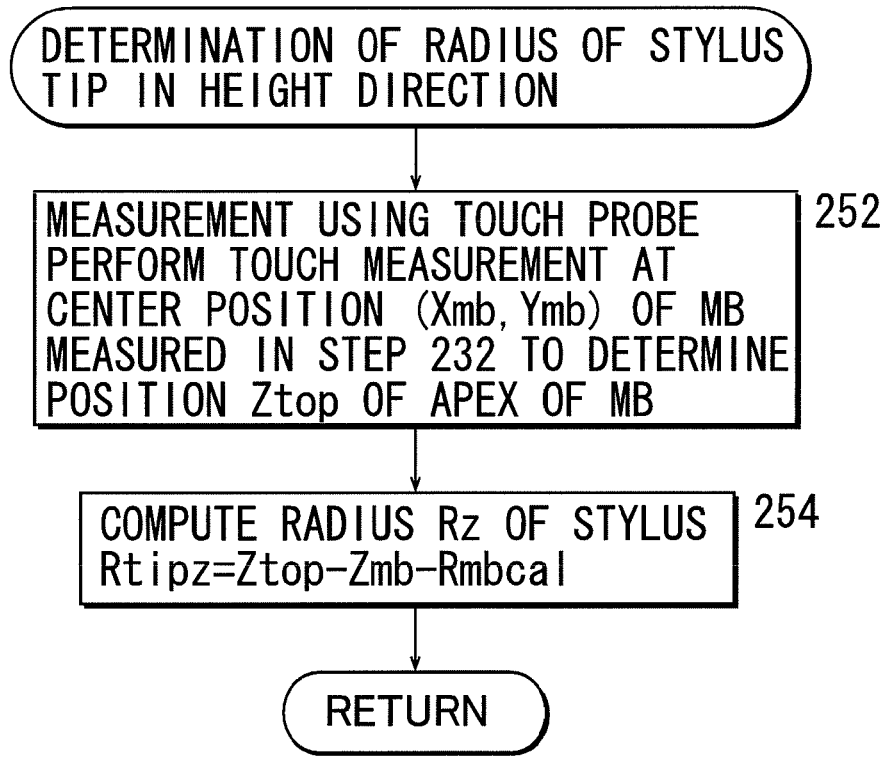
FIG. 18 is a flowchart showing the procedure of measuring the radius of the stylus tip in a height direction.
Figure 19:
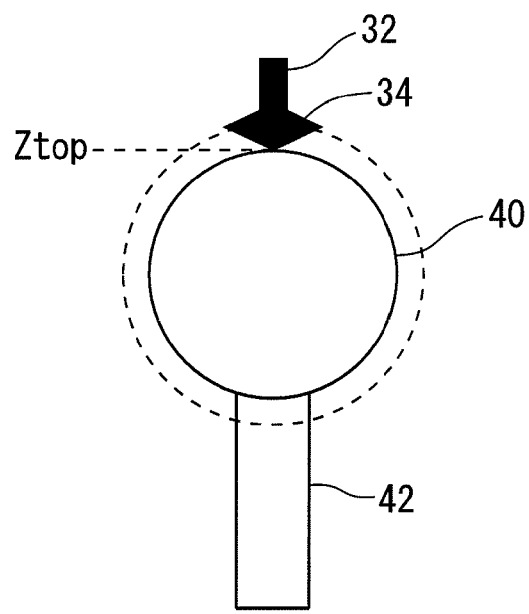
FIG. 19 is a front view illustrating a state in which the radius of the stylus tip in the height direction is measured.

Next, the process proceeds to step 250 in FIG. 11, and the radius Rtipz of the stylus tip in the height direction is measured. Specifically, the process proceeds to step 252 in FIG. 18, and touch measurement is performed using the touch probe 28 at the spherical center position (Xmb, Ymb) of the master ball 40 measured in step 232 as shown in FIG. 19 to thereby determine the position Ztop of the apex of the master ball. Next, the process proceeds to step 254, and the radius Rtipz of the stylus is computed using the following formula.

$$Rtipz = Ztop - Zmb - Rmbcal \quad (5)$$

Figure 8:
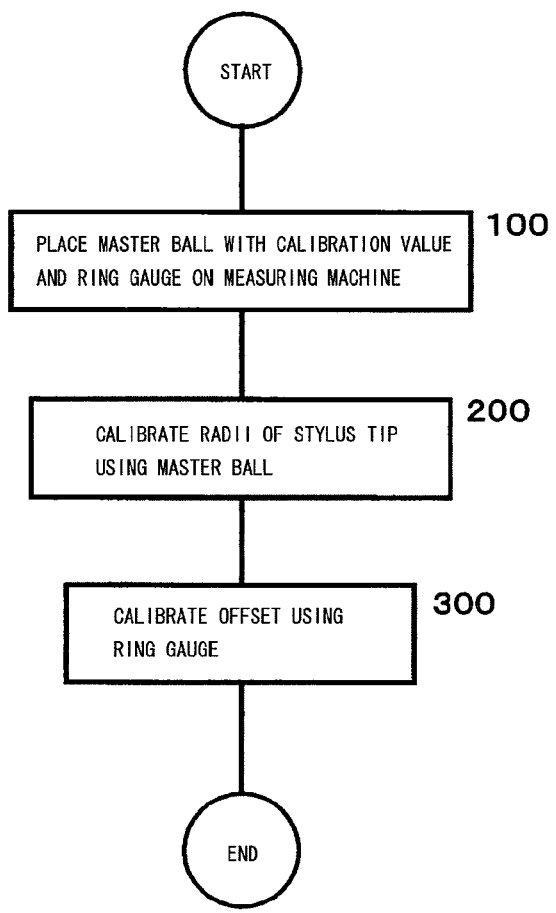
FIG. 8 is a flowchart showing a procedure in the embodiment of the calibration method according to the present invention.
Figure 20:
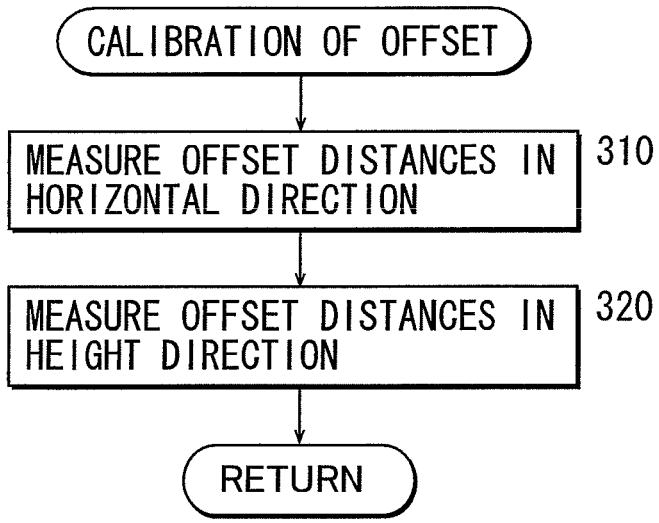
FIG. 20 is a flowchart showing the procedure of calibration of an offset.
Figure 21:
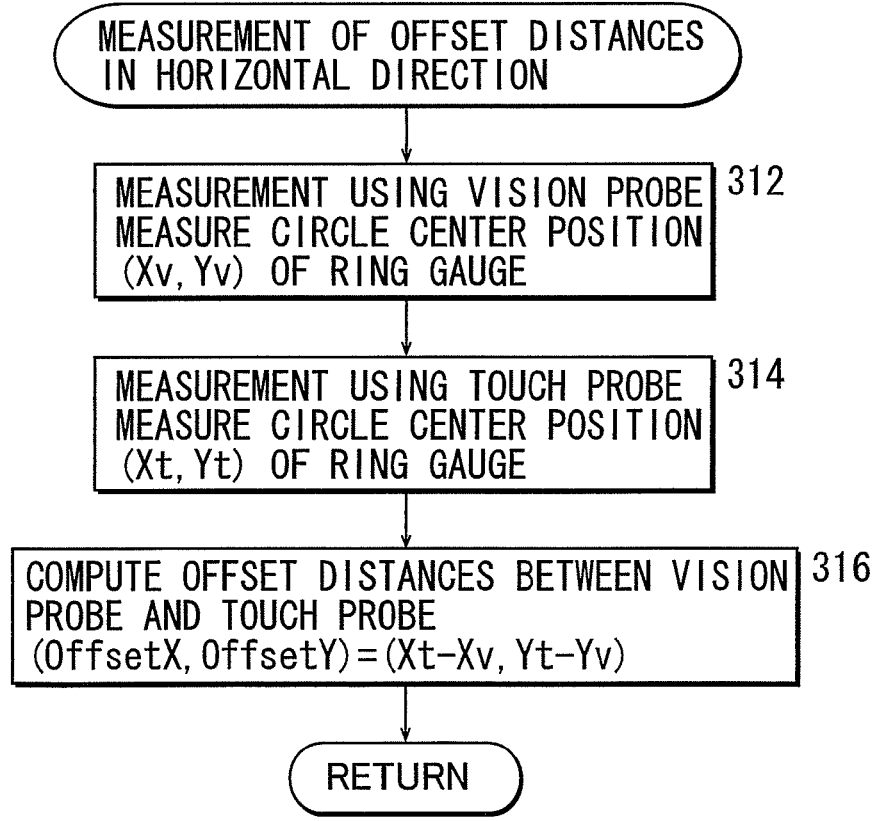
FIG. 21 is a flowchart showing the procedure of measuring offset distances in the horizontal direction.
Figure 22:
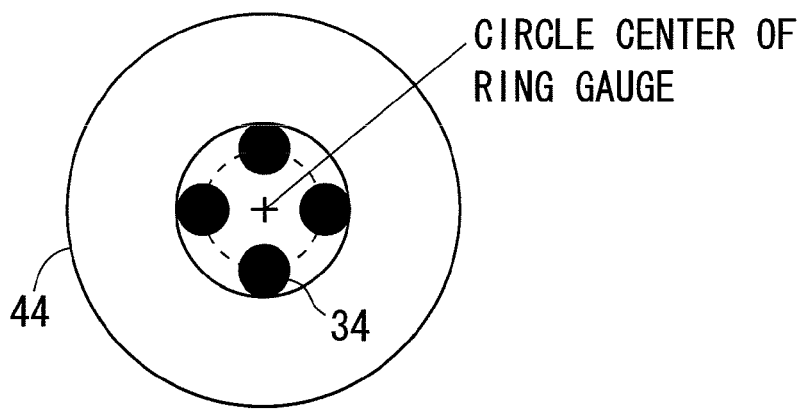
FIG. 22 is a plan view illustrating a state in which the offset distances in the horizontal direction are measured using the ring gauge.

Next, the process proceeds to step 300 in FIG. 8, and the offset is calibrated using the ring gauge 44, as shown in FIG. 20. Specifically, first, offset distances in the horizontal direction are measured in step 310. More specifically, as shown in FIG. 21, first, the circle center position (Xv, Yv) of the ring gauge 44 is measured using the vision probe 24 in step 312. Next, in step 314, the circle center position (Xt, Yt) of the ring gauge 44 is measured using the touch probe 28, as shown in FIG. 22. Next, in step 316, the offset distances between the vision probe 24 and the touch probe 28 are computed using the following formula.

$$(OffsetX, OffsetY) = (Xt - Xv, Yt - Yv) \quad (6)$$

Figure 23:
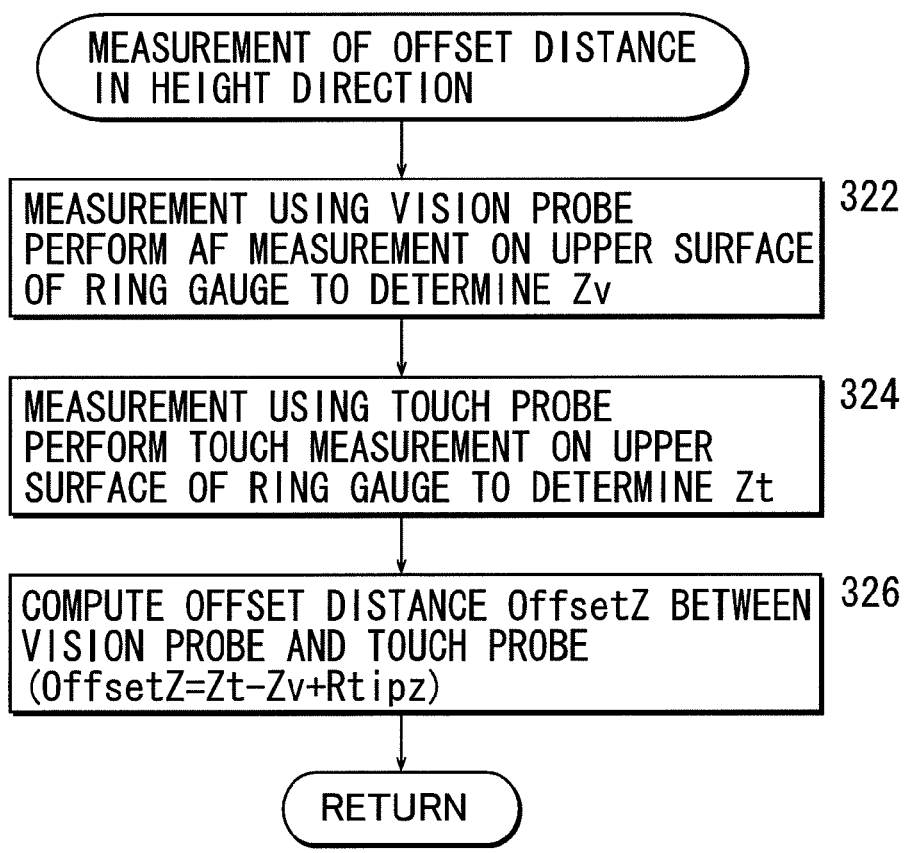
FIG. 23 is a flowchart showing the procedure of measuring an offset distance in the height direction.
Figure 24:
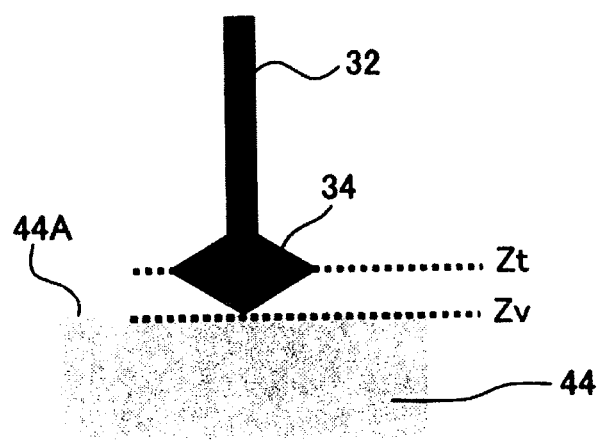
FIG. 24 is a front view illustrating a state in which the offset distance in the height direction is measured using the ring gauge.

After completion of step 316, the process returns to step 320 in FIG. 20, and the offset distance in the height direction is measured. Specifically, in step 322 in FIG. 23, autofocus (AF) measurement is performed on an upper surface 44A of the ring gauge 44 using the vision probe 24 to measure height Zv. Next, in step 324, touch measurement is performed on the upper surface 44A of the ring gauge 44 using the touch probe 28 as shown in FIG. 24 to measure height Zt. Next, in step 326, the offset distance OffsetZ between the vision probe 24 and the touch probe 28 in the height direction is computed using the following formula.

$$OffsetZ = Zt - Zv + Rtipz \quad (7)$$

The calibrated radii of the stylus tip and the calibrated offset distances can be obtained in the manner described above.

In the above embodiment, the coordinate measuring machine used is an image measuring machine, and not only the dimensions of the stylus tip but also the offset between the vision probe and the stylus is calibrated. However, the range of application of the present invention is not limited thereto. The present invention is applicable to general coordinate measuring apparatuses other than the image measuring machine such as three-dimensional coordinate measuring machines with no vision probe, so long as the double cone stylus can be installed, and only the dimensions of the stylus tip may be calibrated.

It should be apparent to those skilled in the art that the above-described exemplary embodiments are merely illustrative which represent the application of the principles of the present invention. Numerous and varied other arrangements can be readily devised by those skilled in the art without departing from the spirit and the scope of the invention.

What is claimed is:

1. A method of calibrating a double cone stylus included in at least one of a coordinate measuring machine and a contour measuring machine including a touch probe having the double cone stylus attached to a tip end thereof, the method comprising, when dimensions of a stylus tip of the double cone stylus are calibrated:

disposing a master ball with a calibration value in the at least one of the coordinate measuring machine and the contour measuring machine;

performing touch measurement on the master ball using the touch probe to acquire a center position and a radius of the master ball;

computing a radius of the stylus tip in a horizontal direction;

performing touch measurement to determine a position of an apex of the master ball using the touch probe to acquire a height of the apex of the master ball; and computing a radius of the stylus tip in a height direction.

2. The method of calibrating the double cone stylus according to claim 1, wherein the radius of the stylus tip in the horizontal direction is computed by:

determining provisional values of the center position of the master ball using values measured near the apex of the master ball;

performing measurement on the master ball along search lines extending in a vertical direction around an equator of the master ball that is determined from the provisional values of the center position to thereby determine final values of the center position of the master ball and a final value of the radius of the master ball; and computing the radius of the stylus tip in the horizontal direction using the final value of the radius of the master ball, and wherein the radius of the stylus tip in the height direction is computed by performing touch measurement at the center position of the master ball to determine the position of the apex of the master ball.

3. A method of calibrating a double cone stylus included in at least one of a coordinate measuring machine and a contour measuring machine including a vision probe and a touch probe having the double cone stylus attached to a tip end thereof, the method comprising, when dimensions of a stylus tip of the double cone stylus and an offset between the touch probe and the vision probe are calibrated:

disposing a master ball with a calibration value and a ring gauge on the at least one of the coordinate measuring machine and the contour measuring machine; and performing measurement sequentially on the master ball and the ring gauge using the touch probe and the vision probe to calibrate the dimensions of the stylus tip and the offset between the touch probe and the vision probe.

4. The method of calibrating the double cone stylus according to claim 3, wherein an offset distance between the vision probe and the touch probe is computed by performing measurement on the ring gauge using the vision probe and the touch probe sequentially.

5. The method of calibrating the double cone stylus according to claim 4, wherein the offset distance is an offset distance between the vision probe and the touch probe in a horizontal direction computed by:
   measuring a circle center position of the ring gauge using the vision probe; and
   measuring the circle center position of the ring gauge using the touch probe.

6. The method of calibrating the double cone stylus according to claim 4, wherein the offset distance is an offset distance between the vision probe and the touch probe in a height direction computed by:
   measuring a position of an upper surface of the ring gauge using the vision probe; and
   measuring a height when the touch probe touches the upper surface of the ring gauge.

* * * * *